United States Patent
Manchester et al.

(10) Patent No.: US 7,657,612 B2
(45) Date of Patent: Feb. 2, 2010

(54) XML SCHEMA FOR NETWORK DEVICE CONFIGURATION

(75) Inventors: Scott Manchester, Redmond, WA (US); Dalen Abraham, Duvall, WA (US); Mohammad Shabbir Alam, Redmond, WA (US); Jean-Pierre Duplessis, Redmond, WA (US); Trevor W. Freeman, Sammamish, WA (US); Bill Hanlon, Bellevue, WA (US); Anton W. Krantz, Kirkland, WA (US); Benjamin Nick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 10/806,331

(22) Filed: Mar. 23, 2004

(65) Prior Publication Data

US 2005/0149626 A1     Jul. 7, 2005

Related U.S. Application Data

(60) Provisional application No. 60/534,795, filed on Jan. 7, 2004.

(51) Int. Cl.
*G06F 17/30* (2006.01)
*G06F 15/173* (2006.01)

(52) U.S. Cl. .................. 709/220; 709/226; 709/221; 709/222; 709/227; 709/223; 380/282; 380/47; 380/44; 380/46

(58) Field of Classification Search ......... 709/206–207, 709/200, 220, 226, 221, 222, 223, 203, 204
See application file for complete search history.

(56) References Cited

U.S. PATENT DOCUMENTS

| | | | |
|---|---|---|---|
| 5,933,504 A | 8/1999 | Vanstone et al. | |
| 6,052,720 A | 4/2000 | Traversat et al. | |
| 6,078,667 A | 6/2000 | Johnson | |
| 6,148,354 A | 11/2000 | Ban et al. | |
| 6,178,507 B1 | 1/2001 | Vanstone | |
| 6,195,433 B1 | 2/2001 | Vanstone et al. | |
| 6,449,642 B2 | 9/2002 | Bourke-Dunphy et al. | |
| 6,526,264 B2 | 2/2003 | Sugar et al. | |
| 6,563,928 B1 | 5/2003 | Vanstone et al. | |
| 6,654,841 B2 | 11/2003 | Lin | |
| 6,687,492 B1 | 2/2004 | Sugar et al. | |
| 6,700,450 B2 | 3/2004 | Rogers | |
| 6,714,605 B2 | 3/2004 | Sugar et al. | |

(Continued)

OTHER PUBLICATIONS

U.S. Appl. No. 10/806,369, filed Mar. 23, 2004, Manchester et al.

(Continued)

*Primary Examiner*—Jude Jean-Gilles
(74) *Attorney, Agent, or Firm*—Marshall, Gerstein & Borun LLP

(57) ABSTRACT

An Extensible Mark-up Language (XML) schema is used to generate configuration settings files. A wireless configuration XML schema defines an XML file for configuring wireless network settings on a wireless device. A wide area network (WAN) configuration schema defines an XML file for configuring a WAN device. A local area network (LAN) configuration schema defines an XML file for configuring a LAN device. A broadband modem configuration schema defines an XML file for configuring a broadband modem device. A device configuration schema defines an XML file for reporting the configuration of a device.

18 Claims, 12 Drawing Sheets

U.S. PATENT DOCUMENTS

| | | | |
|---|---|---|---|
| 6,728,517 | B2 | 4/2004 | Sugar et al. |
| 6,785,520 | B2 | 8/2004 | Sugar et al. |
| 6,850,735 | B2 | 2/2005 | Sugar et al. |
| 7,340,611 | B2* | 3/2008 | Alev et al. ................. 713/180 |
| 2001/0014153 | A1 | 8/2001 | Johnson |
| 2002/0090085 | A1 | 7/2002 | Vanstone et al. |
| 2002/0152380 | A1 | 10/2002 | O'Shea et al. |
| 2002/0152384 | A1 | 10/2002 | Shelest et al. |
| 2003/0081791 | A1* | 5/2003 | Erickson et al. ............. 380/282 |
| 2003/0101247 | A1 | 5/2003 | Kumbalimutt et al. |
| 2003/0225971 | A1 | 12/2003 | Oishi et al. |
| 2004/0002943 | A1 | 1/2004 | Merrill et al. |
| 2004/0010429 | A1 | 1/2004 | Vedula et al. |
| 2004/0024875 | A1 | 2/2004 | Horvitz et al. |
| 2004/0038592 | A1 | 2/2004 | Yang |

OTHER PUBLICATIONS

U.S. Appl. No. 10/807,095, filed Mar. 23, 2004, Manchester et al.
U.S. Appl. No. 10/806,331, filed Mar. 23, 2004, Manchester et al.
U.S. Appl. No. 10/806,772, filed Mar. 23, 2004, Freeman et al.
U.S. Appl. No. 10/806,836, filed Mar. 23, 2004, Manchester et al.
U.S. Appl. No. 60/534,795, filed Jan. 7, 2004, Abraham et al.
U.S. Appl. No. 60/592,506, filed Jul. 30, 2004, Corbett et al.
U.S. Appl. No. 10/967,368, filed Oct. 18, 2004, Crosier et al.
Bailie, et al., "The Networked Digital Home," *Soundscapes Info*, (2002) printed Mar. 29, 2004, pp. 1-2, <http://icce.rug.nl/~soundscapes/VOLUME05/LSI_mediacast.html>.
Balfanz, et al., *Talking to Strangers: Authentication in ad hoc Wireless Networks*, In Symposium on Network and Distributed Systems Security, San Diego, California, 2002, printed Mar. 24, 2004, pp. 1-14, <http://citeseer.ist.psu.edu/balfanz02talking.htm>.
Harkins et al., *The Internet Key Exchange (IKE)*, Network Working Group RFC 2409, 1-41pp. (Nov. 1998).
Huang, et al., *Making Computers Disappear: Appliance Data Services*, pp. 1-14, Mobilcom 2001, Rome, Italy (2001).
Kent et al., *IP Authentication Header*, Network Working Group RFC 2402, 1-22 pp., Nov. 1998.
Kent et al., *IP Encapsulating Security Protocol*, Network Working Group RFC 2406, 1-22 pp. (Nov. 1998).
Maitland, *Okapi Unlocks iSCSI*, printed Mar. 24, 2004, pp. 1-9, (2003-2004) <http://www.byteandswitch.com/document.asp?doc_id=19173>.
Nexware Corporation, "Software Solutions: Networked Solutions," Nexwarecorp.com (2001), printed Mar. 29, 2004, pp. 1, <http://www.nexwarecorp.com/products/networked_solutions.htm>.
Rescorla, *Diffie-Hellman Key Agreement Method*, Network Working Group RFC 2631, 1-13 pp. (Jun. 1999).
Schroder, *USB Pen Drives: Large Portable Storage in a Tiny Package*, (Dec. 2003) printed Mar. 24, 2004, pp. 1-9, <http://networking.earthweb.com/nethub/article.php/10950-3291891_1>.
Unknown, *Using Smart Cards With the Sun Ray 1 Enterprise Appliance*, Revision 01, pp. 1-15, Palo Alto, California (Sep. 1999).
Unknown, *Integrating Sun Ray 1 Enterprise Appliances and Microsoft Windows NT*, Sun Microsystems, Inc., pp. 1-19, Palo Alto, California (2000).
Unknown, *Smart Card for Temporary Facilities Security*, Information Methods Incorporated Group, LLC, pp. 1-16, (Jan. 2004).
Unknown, *Sun Ray Overview*, Sun Microsystems, Inc., pp. 1-28, Santa Clara, California (Apr. 2003).
Unknown, *Sun Ray Interoperability Brief*, Sun Microsystems, Inc., pp. 1-14, Santa Clara, California (Aug. 2003).
Unknown, "Sun Ray," *Editor's Choice Communication Solutions*, (Jun. 2004) printed Mar. 26, 2004, pp. 1-8, <http://www.tmcnet.com/comsol/0601/0601lab2.htm>.
Unknown, "Linksys Instant Wireless USB Network Adapter WUSB11 Network Adapter," *Product Review*, (2004) printed Mar. 24, 2005, pp. 1-4, <http://hardwarecentral.dealtime.com/xPR_Linksys_Instant_Wireless_WUSB11>.
Wakefield, *Wireless Technology and Your Mobile Device*, Microsoft Support WebCast, transcript pp. 1-13, slides pp. 1-60, printed Oct. 31, 2002, <http://support.microsoft.com/default.aspx?acid+%2Fservicedesks%2Fwebcasts%2Fen%2Fwc103102.asp>.
Ylisaukko-Ojai, et al., *Low Capacity Wireless Home Networks—Cheap and Simple Interconnections between Devices*, pp. 1-20, Version 1.0, Ilkk Korhonen,(May 2002).
U.S. Appl. No. 11/060,290, filed Feb. 17, 2005, Madhavan et al.
U.S. Appl. No. 11/096,042, filed Mar. 31, 2005, Gatta et al.

* cited by examiner

XML SCHEMA FOR NETWORK DEVICE CONFIGURATION

This patent application claims the benefit of U.S. Provisional Patent Application No. 60/534,795 file Jan. 7, 2004.

FIELD OF THE INVENTION

This invention pertains generally to the field of computer networks and more particularly to a schema for simplifying the process of configuring nodes in computer networks.

BACKGROUND OF THE INVENTION

The use of data communication networks continues to grow. In small as well as large corporate settings, wired local area networks (LANs) and wide area networks (WANs) have become an established feature of conducting business, and wireless networks are being increasingly employed. The use of network technology in the home, both wired and wireless, is a more recent phenomenon and has been slower to develop. In addition to facilitating Internet connectivity, home networking permits personal computing devices and various consumer electronic devices and appliances within the home to communicate with each other. Wireless technology, such as IEEE 802.11 wireless networks and networks of Bluetooth-enabled devices, is attractive in home as well as corporate environments for reasons of convenience, mobility and flexibility.

A principal impediment to the wider adoption of networking technology in the home and other non-corporate environments has been the difficulty experienced by non-expert users in configuring network devices. For example, it can be troublesome for such users to configure a device to function as a wireless access point (WAP). Setting up an ad hoc wireless network of peer devices (such as wireless PCs, wireless printers, and PDAs) is also typically a complex task. Each peer device must have the same network settings, and a secure ad hoc network typically requires each peer device to have a common WEP key, which must be communicated to the user of the peer device and entered manually. Thin client devices, such as digital audio receivers and wireless printers, which comprise an increasing number of home network devices, are particularly laborious to configure for network connectivity because they lack the convenient and intuitive I/O capabilities of conventional personal computers.

BRIEF SUMMARY OF THE INVENTION

In accordance with the invention, an Extensible Markup Language (XML) schema is used to generate XML files that are used to configure network devices to allow network functionality and connectivity. In an embodiment of the invention, an XML schema for wireless device configuration includes a network identifier element and a network encryption key element. In keeping with the features of the invention, the wireless device configuration schema further includes a connection type element, an authentication type element, an encryption type element, and a device mode indicator element. An automatic key element indicates whether a network key is provided automatically, and an 802.1x element indicates whether a device supports IEEE 802.1x protocol. A frequency indicator element may also be used to indicate an operating frequency. A time-to-live element is used to define a time for which an instance of the schema is valid.

In another embodiment of the invention, an XML schema for wide area network (WAN) device configuration includes a DNS automatic element for indicating whether a DNS internet protocol (IP) address is provided automatically, a clone media access control (MAC) address element for indicating whether a MAC should be cloned, and a MAC address element. In keeping with the features of the present invention, the WAN device configuration schema further includes a DNS IP address element, a connection type element, and a WAN type element. The connection type element may include one of a point-to-point protocol (PPP) over Ethernet subelement and an IP subelement. The WAN type element may include one of a dynamic host configuration protocol (DHCP) subelement and a static IP subelement.

In yet another embodiment of the invention, an XML schema for local area network (LAN) device configuration includes a device name element, a device description element, and a LAN configuration element. The LAN configuration element may include one of a workgroup name subelement and a domain name subelement. The schema may further include a castle element.

In a further embodiment of the invention, an XML schema for broadband modem device configuration includes a session instance identifier element, a DHCP element for indicating whether DHCP is supported and a link modulation element for indicating a type of broadband connection. The broadband modem device configuration schema may further include a user name element, a password element, and an asynchronous transfer mode (ATM) encapsulation element for indicating a type of ATM encapsulation.

In still another embodiment of the invention, an XML schema for generating a device configuration report includes a manufacturer element, a model name element, and a serial number element. The schema may further include a manufacturer's uniform resource locator (URL) element, a device status element, a device type element, a network settings element, a wireless authentication element for indicating supported wireless authentication protocols, and a wireless encryption element for indicating supported wireless encryption protocols. In keeping with the features of the invention, the schema may also include a wireless configuration element for a wireless client device, a wireless infrastructure device, or a wireless access point device.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Methods and systems for configuring network devices with a portable media device will now be described with respect to certain embodiments. The skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
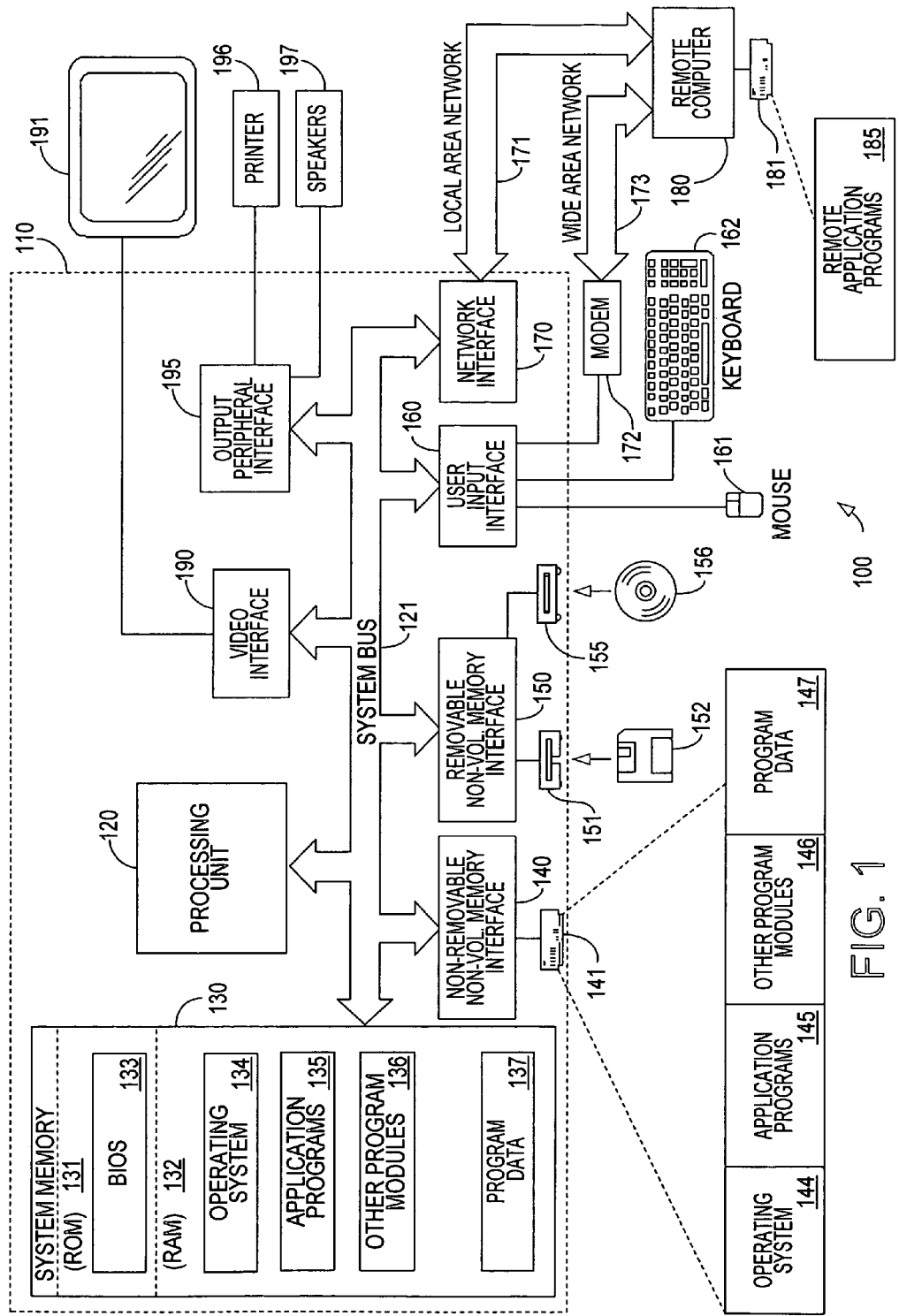
FIG. 1 is a simplified schematic diagram illustrating an exemplary architecture of a computing device for carrying out the configuration of a computer network in accordance with an embodiment of the invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although at least one embodiment of the invention does include each component illustrated in the exemplary operating environment 100, another more typical embodiment of the invention excludes some or all non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer-readable media. Computer-readable media can be any available media that can be accessed by the computer 110 and includes both volatile and nonvolatile media, and removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

The system memory 130 includes computer storage media in the form of volatile and/or nonvolatile memory such as read only memory (ROM) 131 and random access memory (RAM) 132. By way of example, and not limitation, FIG. 1 illustrates operating system 134, application programs 135, other program modules 136 and program data 137.

The computer 110 may also include other removable and nonremovable, volatile and nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 by way of an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 preferably operates or is adaptable to operate in a networked environment using logical connections to one or more remote computers, such as a remote computer 180. The remote computer 180 may be a personal computer, a server, a router, a peer device or other network node, and typically includes some or all of the elements described above relative to the computer 110, although only a memory storage device 181 has been illustrated in FIG. 1. The logical connections depicted in FIG. 1 include a LAN 171 and a WAN 173, but may also include other networks. For example, in the present invention, the computer 110 may comprise the source machine from which data is being migrated, and the remote computer 180 may comprise the destination machine. Note however that source and destination machines need not be initially connected by a network or otherwise, but instead, data may be migrated by way of any media capable of being written by the source platform and read by the destination platform or platforms. For example, one non-limiting instance of such a medium is a portable flash memory medium, sometimes referred to as a memory "key" or memory "stick." Other non-limiting examples will be given below.

When used in a LAN environment, the computer 110 is connectable to the LAN 171 through a network interface or adapter 170. The computer 110 may also include a modem 172 or other means for establishing communications over the WAN 173. The modem 172, which may be internal or external, may be connected to the system bus 121 by way of the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
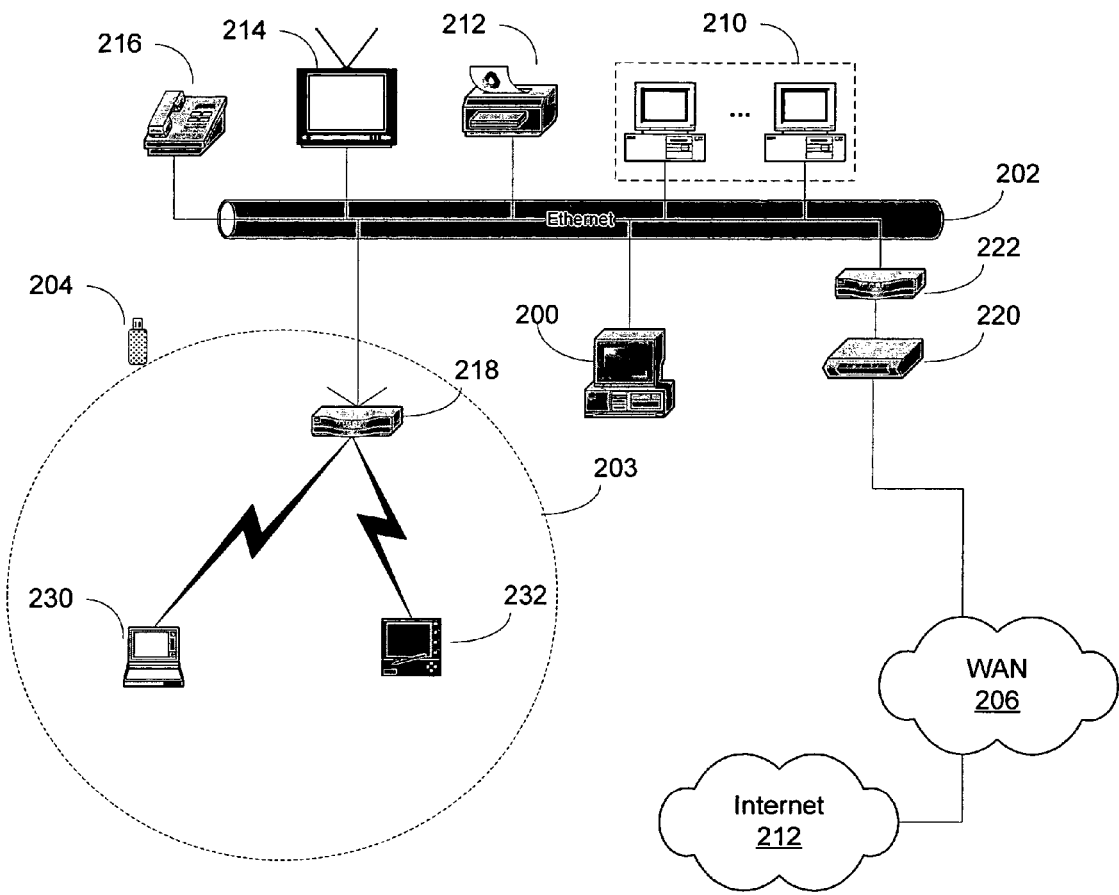
FIG. 2 is a diagram illustrating an arrangement of computing devices for carrying out the configuration of a computer network in accordance with an embodiment of the invention.

Turning to FIG. 2, a simple example of a computing environment usable in implementing an embodiment of the invention is depicted. In the example shown in FIG. 2, a computer 200 communicates with a LAN 202 by way of a physical connection. Alternatively, the computer 200 communicates with the LAN 202 by way of WAN or other communications media. In an embodiment of the invention, the computer 200 is not initially in communications with any other device or network at all. In an embodiment of the invention, the computer 200 executes a program that generates network configuration settings in accordance with an XML schema. These settings are stored on a portable media device (PM) 204, such as a USB flash drive, Memory Stick, CompactFlash card, SmartMedia card, or other storage device. The computer 200 may directly accept the PM 204 by way of a built-in USB port, but alternatively is connected to a peripheral device, such as a card reader, that accepts the PM 204. In one embodiment, the PM 204 is a Bluetooth device that communicates wirelessly with the computer 200.

Once settings have been generated and stored on the PM, then, by attaching the PM 204 to various networkable devices, the appropriate network configuration settings are transferred to those devices, enabling network communications over a LAN 202, WAN 206, WLAN 208 or other types of computer networks. Exemplary networkable devices accepting the PM 204 include other computers 210 physically connected to the LAN 202. Although the other computers 210 are physically connected to the same LAN 202, they generally cannot communicate with one another until their network settings are appropriately configured. By attaching the PM 204, the appropriate network settings are transferred to the other computers 210, allowing for network communication between them. Similarly, a printer 212 accepting the PM 204 is configured for communications on the LAN 202, and/or on a wireless network 203, making the printer 212 accessible to the computer 200 and other devices on the LAN 202 and/or wireless network 203. A networkable television 214 and networkable telephone 216 also accept the PM 204 and are thereby configured for communications on the LAN 202 and/or wireless network 203. In an exemplary embodiment, wireless network 203 is an IEEE 802.11 standard wireless network. In an alternative embodiment, wireless network 203 is a WiMAX standard wireless network. However, those skilled in the art will appreciate that the wireless network 203 may be in accordance with any past, present or future wireless network protocol.

Other network hardware is likewise configured for network communication by attaching the PM 204. A wireless access point 218 accepts the PM 204 and is thus configured to allow communications between devices on the LAN 202 and other appropriately configured wireless devices. For example, if the computer 200 was equipped with wireless networking hardware, then it could connect to the LAN 202 by communicating wirelessly with the wireless access point 218. A modem 220 and router 222 also accept the PM 204 and are thereby configured to allow communication between devices on the LAN 202 and devices connected to a WAN 206 or the Internet 224. Notably, attaching the PM 204 allows for network configuration on devices such as modems 220 and routers 222 that typically do not contain input and output mechanisms such as keyboards and monitors.

The PM 204 is also used to configure wireless networks. For example, a notebook computer 230 and a tablet computer 232 each accept the PM 204 and are thus appropriately configured for wireless communications over wireless network 203. Without the PM 204, a user would have to enter configuration settings—including the network name and any security keys—in order to access the wireless network 203. By attaching the PM 204, a computer is granted access to the wireless network 203 quickly and transparently. The computer networks configured by the PM 204 can be peer-to-peer networks (e.g., unmanaged "workgroups" that do not require a dedicated server) or domain-based networks such as client-server networks.

Figure 3:
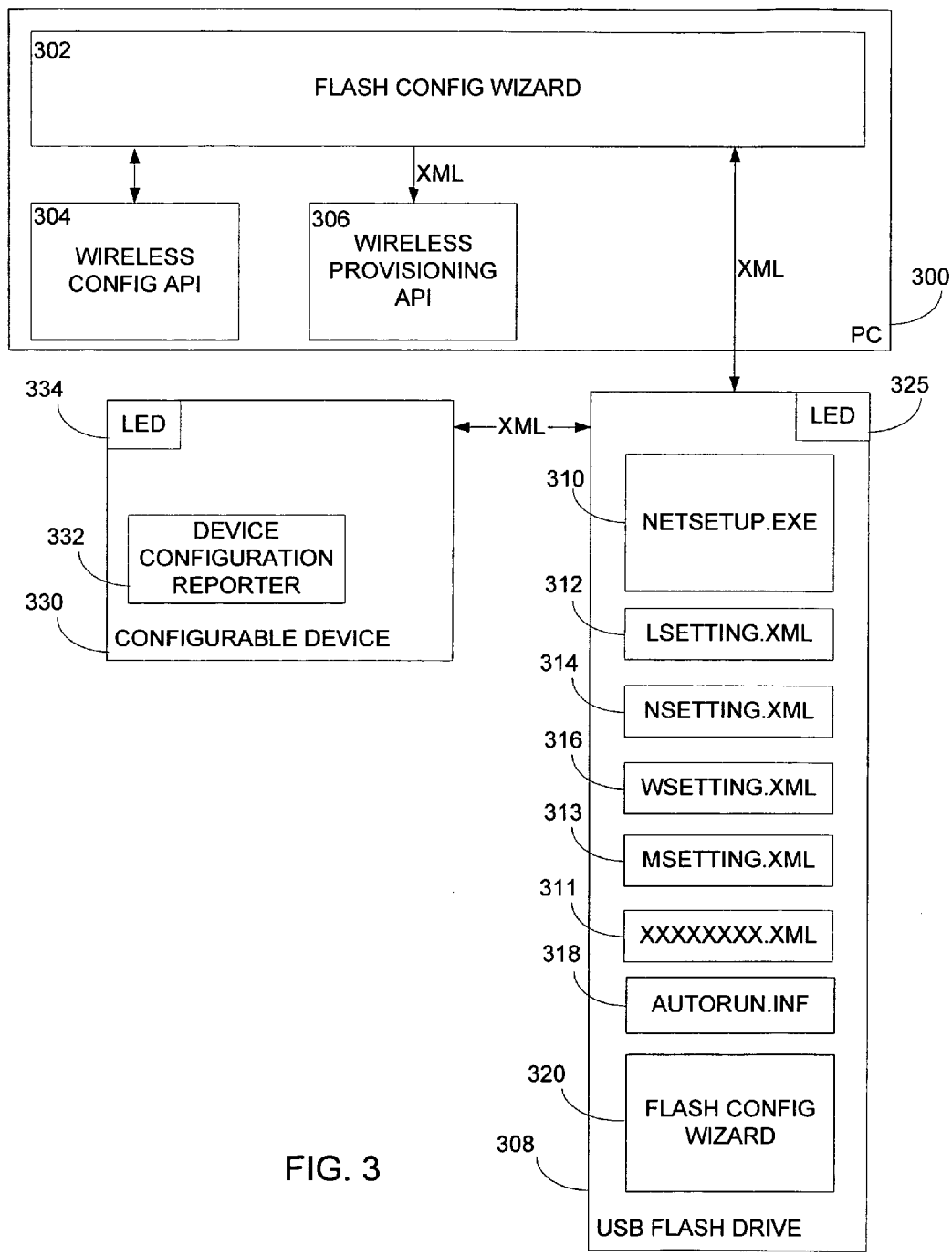
FIG. 3 is a simplified schematic illustrating a software architecture for carrying out the configuration of a computer network in accordance with an embodiment of the invention.

Turning attention to FIG. 3, a software architecture for generating and storing network configuration settings is now described, in accordance with an embodiment of the invention. A Flash Config Wizard 302 is executed on a computer 300 and communicates with the computer through a wireless configuration application programming interface (API) 304 to generate wireless network configuration settings. In the Windows operating system environment, for example, the WZCDLG.DLL library can be used. In one embodiment, the Flash Config Wizard 302 is a standalone application. In another embodiment, the Flash Config Wizard 302 is integrated into a general network setup application. The Flash Config Wizard 302 generates XML files in accordance with a schema and outputs the XML files to the computer through a wireless provisioning API 306. The Flash Config Wizard 302 further outputs the XML files to an attached portable media device, such as a USB flash drive 308. The USB flash drive 308 stores files and applications for use in the network configuration process. An embodiment of the invention includes a network setup application 310 stored in the root of the USB Flash Drive 308 in order to facilitate the configuring of network settings on other devices. The network setup application is stored on the USB flash drive 308 by the Flash Config Wizard 302. When the USB flash drive 308 is attached to another device, that device can run the network setup application 310 to load the relevant network settings from the USB flash drive 308 to the other device.

The USB flash drive 308 further stores an autorun file 318. When the USB flash drive 308 is attached to a compatible device that recognizes the autorun file, the detection of the autorun file 318 automatically triggers the device to execute the network setup program 310. In this way, no user intervention is required to transfer the network settings to the device after the USB flash drive 308 has been attached. The USB flash drive 308 also stores a Flash Config Wizard copy 320. When the USB flash drive 308 is attached to another computer, the Flash Config Wizard 320 is executed by the computer to allow for manual guidance in transferring and modifying the network configuration settings.

Also stored on the USB flash drive 308 are several XML files representing the network configuration settings generated in accordance with a schema. These files are stored in a folder named SMRTNKEY on the USB flash drive 308. An LSETTING.XML file 312 contains settings for a LAN, and is generated using a LAN configuration schema. An NSETTING.XML file 314 contains settings for a WAN, and is generated using a WAN configuration schema. A WSETTING.XML file 316 contains settings for a wireless LAN, and is generated using a wireless configuration schema. An MSETTINGS.XML file 313 contains settings for a broadband modem, and is generated using a broadband modem configuration schema. By storing these network configuration settings, a single USB flash drive 308 can be used to configure a variety of devices (such as personal computers, routers, printers, PDAs, and WAPs) to communicate over a variety of types of networks.

After the network settings configuration files have been transferred to the USB flash drive 308, the USB flash drive 308 is installed in a configurable device 330. Configurable device 330 must provide support for USB Host Port, USB Mass Storage Devices, file allocation table (FAT) 16/32 file systems, and must include an XML Parser. Additionally access points must support 104 bit wireless encryption protocol (WEP), Infrastructure mode, and IEEE 802.11b protocol. The configurable device 330 includes a light emitting diode (LED) 334 that blinks three times after the network configuration files are downloaded from the USB flash drive 308.

The USB flash drive 308 is also used to store a device configuration file 311 for describing the configuration of a device to which the USB flash drive 308 has been attached. Configurable device 330 further includes a device configuration reporter 332 for generating the device configuration file 311 in accordance with an XML schema. Each device that is configured using the USB flash drive 308 generates an XML file describing the configuration of that device, and reports any fault conditions. The device then writes the device configuration file 311 to the USB flash drive 308, which is next attached to a PC that uploads the device configuration file 311. The PC uses the device configuration file, for example, in a diagnostic tool to determine why network configuration failed. In another example, the PC obtains a uniform resource locator (URL) of the device manufacturer from the device configuration file 311, and uses the URL to download, through hyper text transfer protocol over secure socket layers (HHTPS), an encryption key to access the device. The device configuration file 311 is stored in the SMRTNKY folder in a subfolder having the same name as the device. The device configuration file 311 is named using the last eight bytes of the media access control (MAC) address of the device.

Figure 4:
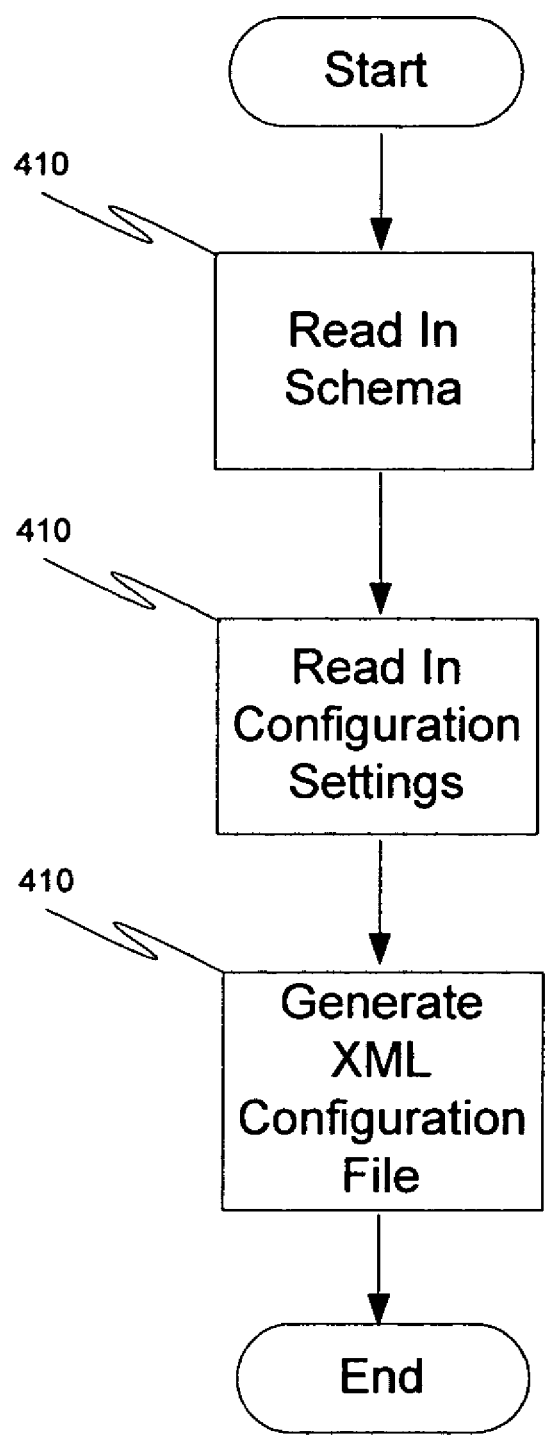
FIG. 4 is a flow diagram illustrating a method of generating a network settings file using a schema.

FIG. 4 illustrates the operation of the Flash Config Wizard in generating the wireless, WAN, LAN, and broadband modem settings files. At step 410, the Flash Config Wizard reads in a schema, for example, a wireless configuration schema. At step 420, the Flash Config Wizard reads in wireless configuration settings, either through an API or user imputer. At step 430, the Flash Config Wizard generates a wireless configuration settings XML file in accordance with the wireless configuration schema, i.e. an instance of the wireless configuration schema. The wireless configuration settings XML file can then be copied to a portable media device and used to configure other devices.

Figure 5:
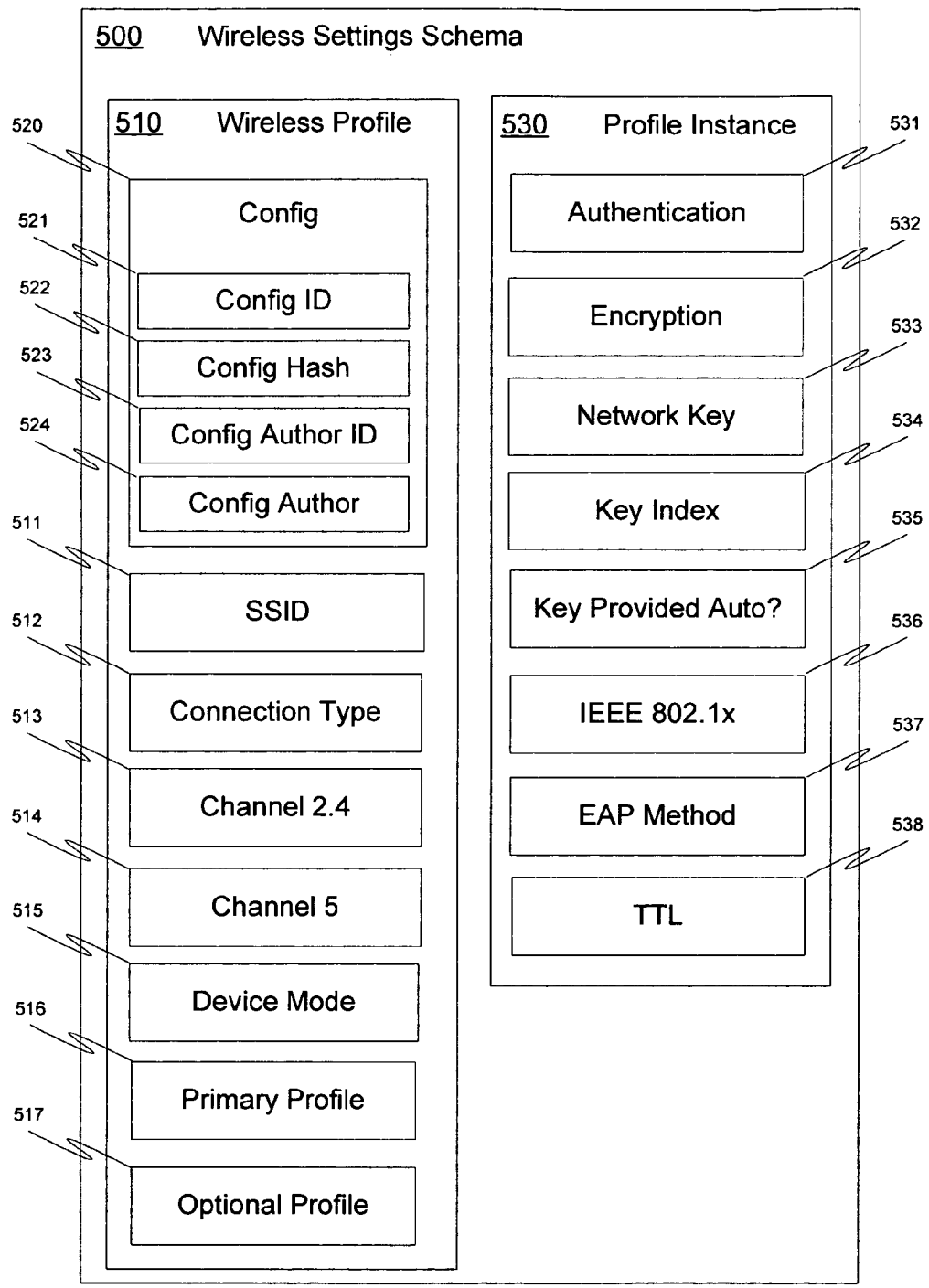
FIG. 5 is a data structure diagram illustrating the wireless network settings schema in accordance with an embodiment of the invention.

In accordance with one embodiment of the invention, FIG. 5 illustrates a conceptualization of the wireless network settings schema 500. Schema 500 includes a wireless profile element 510, which defines the wireless configuration settings. Wireless profile element 510 includes a config subelement 520 for identifying the configuration and the author of the configuration. Config 520 includes subelements config ID 521, config hash 522, config author ID 523, and config author 524. Config ID 521 is a 36 character string for uniquely identifying the configuration, and must occur the wireless settings file once and only once. Config hash 522 is 20 digit hexadecimal number that may be optionally included to test the integrity of the wireless settings file. Config author ID 523 is a 36 character string for uniquely identifying the author of the configuration, and must occur in the wireless settings file once and only once. Config author 524 is a string with a maximum length of 128 indicating the name of the wireless settings file, and must occur in the wireless settings file once and only once.

Wireless profile element 510 further includes subelements for defining each of the wireless configuration settings. Service set identifier (SSID) 511 is a 1-32 byte string representing the name of the wireless network. SSID 511 must occur in the wireless settings file once and only once. Connection type 512 is a string for indicating a network connection type, and may have as its value either extended service set (ESS) in the case of an ad hoc network, or infrastructure basic service set (IBSS) in the case of an infrastructure network. Connection type 512 must occur in the wireless settings file once and only once. Channel 2.4 GHz 513 is an integer for indicating which 2.4 GHz Channel, if any, is being used by the wireless network, Channel 5 GHz 514 is an integer for indicating which 5 GHz channel, if any, is being used by the wireless network. Device mode 515 is a string that indicates the mode in which the wireless access point is operating, and may have a value of infrastructure, bridge, repeater, or station.

The wireless profile element 510 includes a primary profile subelement 516, which must occur in the wireless settings file once and only once. The primary profile element defines the primary wireless configuration that will be used by the device. However, wireless profile 510 may also include an unlimited number of optional profiles 517. The optional profile 517 may define an alternative or additional wireless configuration that may be used if supported by the device. Both the primary profile 516 and the optional profile 517 are an instance of the type profile instance 530, which is also defined in wireless settings schema 500.

Profile instance type 530 includes an authentication type subelement 531. Authentication Type 531 is a string indicating the authentication protocol used by the wireless network, and may take a range of possible values including open, shared, WiFi Protected Access (WPA), WPA Pre-Shared Key (PSK), WPA-none, WPA2, or WPA2 PSK. Authentication type must occur in the profile instance once and only once. Encryption type 532 is a string indicating the encryption protocol used by the wireless network, and may take a range of possible values including none, Wireless Encryption Protocol (WEP), Temporal Key Integrity Protocol (TKIP), and Advanced Encryption Standard (AES). Authentication type 531 and encryption type 532 must occur in the profile instance once and only once.

Profile instance 530 further includes a network key subelement 533, which is a string that the PC will automatically generate, or alternatively, receive from the PC user. The network key 533 is used for encryption on the wireless network. In one embodiment of the invention, the network key 533 must occur in the profile instance once and only once, but may be blank. In an alternative embodiment, the network key 533 does not have to be included in the wireless settings file. Key index 534 is an optional integer for indicating the location of the specific key used to encrypt messages, and is used with WEP. Key provided auto 535 is a boolean subelement for indicating whether a network key is provided automatically, and can have a value of either 0 or 1. 802.1x 536 is a boolean subelement for indicating whether IEEE 802.1x protocol is used on the network, and can have a value of either 0 or 1. Key provided auto 535 and 802.1x 536 must occur in the profile instance once and only once. EAP Method 537 is a string for indicating the Extensible Authentication Protocol used, and may have a value of EAP-TLS, PEAP-EAP-MSCHAPv2, or PEAP-EAP-TLS. This setting is used for 802.1x authentication only. TTL 538 is an optional integer for indicating a time-to-live that specifies the length of time a network key is valid.

An exemplary implementation of the wireless network settings schema 500 is included in Appendix A following this description. An example instance of a wireless network settings file generated in conformance with the schema in Appendix A is included in Appendix B following this description.

Figure 6:
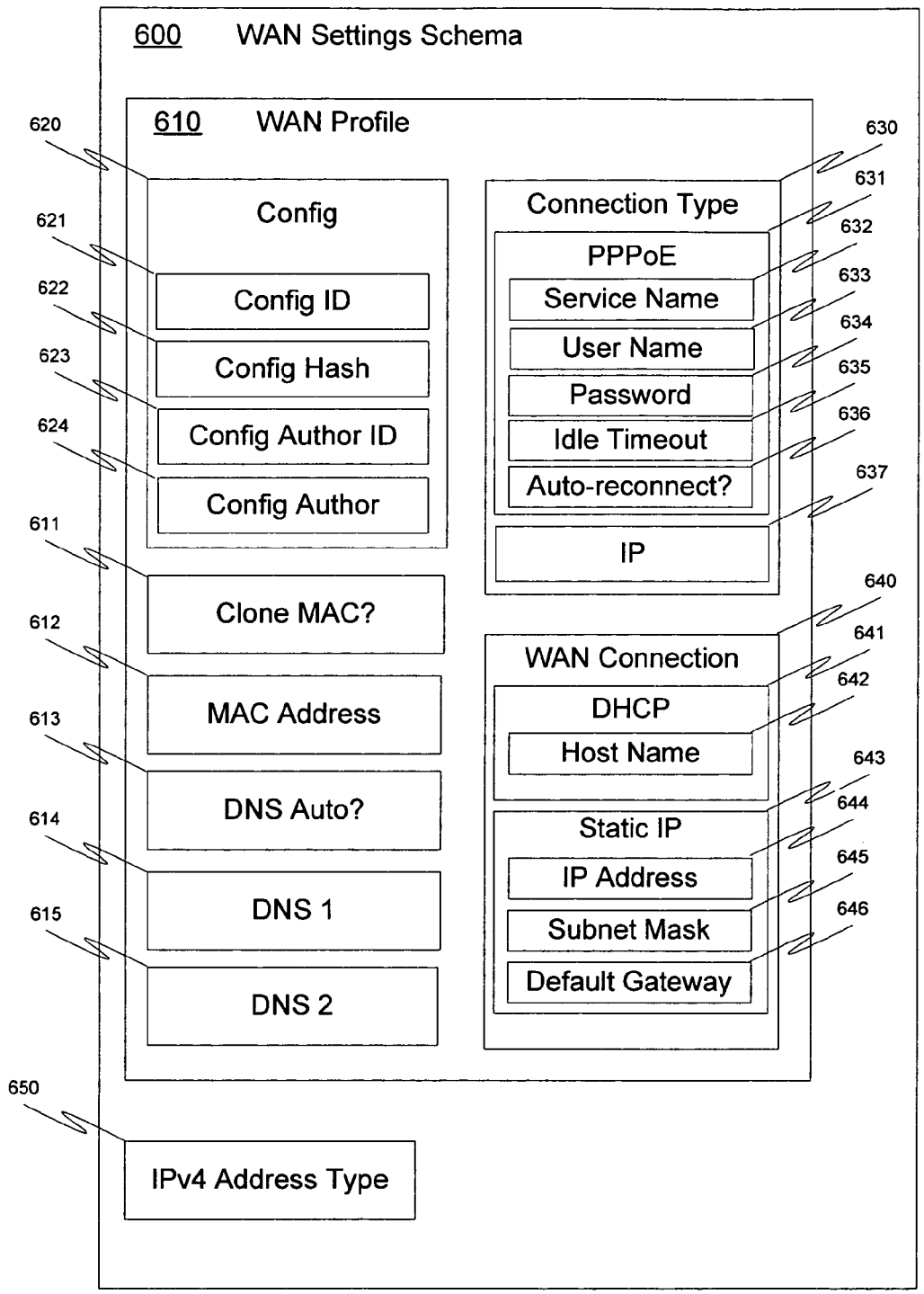
FIG. 6 is a data structure diagram illustrating the wide area network settings schema in accordance with an embodiment of the invention.

In accordance with another embodiment of the invention, FIG. 6 illustrates a conceptualization of the WAN network settings schema 600. Schema 600 includes a WAN profile element 610, which defines the WAN configuration settings. WAN profile element 610 includes a config subelement 620 for identifying the configuration and the author of the configuration. Config 620 includes subelements config ID 621, config hash 622, config author ID 623, and config author 624. Config ID 621 is a 36 character string for uniquely identifying the configuration, and must occur the WAN settings file once and only once. Config hash 622 is 20 digit hexadecimal number that may be optionally included to test the integrity of the WAN settings file. Config author ID 623 is a 36 character string for uniquely identifying the author of the configuration, and must occur in the WAN settings file once and only once. Config author 624 is a string with a maximum length of 128 indicating the name of the WAN settings file, and must occur in the WAN settings file once and only once.

WAN profile element 610 further includes subelements for defining each of the WAN configuration settings. The WAN profile 610 includes the subelement clone MAC address 611, which is a boolean that indicates whether the MAC address of the client should be cloned for use in the WAN. Clone MAC address 611 must occur in the WAN settings file, and takes a value of 0 or 1. MAC address 612 is an 8 character hexadecimal number that defines the MAC address of the client. DNS IP auto pushed 613 is a boolean that indicates whether a domain name service IP address is automatically pushed to the DHCP client. DNS IP auto pushed 613 must occur in the WAN settings file, and takes a value of 0 or 1. DNS1 IP address 1215 and DNS2 IP address 1216 define IP addresses for domain name servers, are type IPv4 addresses.

WAN profile 610 further includes a connection type subelement 630 that specifies whether the connection is via Point-to-Point Protocol over Ethernet (PPPoE) 631 or IP 632. If the connection type is PPoE, the PPPoE subelement 631 further includes subelements service name 632, username 633, password 634, max idle time 635, and auto-reconnect 636, all of which must occur in the WAN settings file. Service Name 632 defines a 1-40 character string indicating the name of a PPPoE server. Username 633 defines a 1-64 character string for indicating the username a device to be configured, and password 634 defines a 1-64 character string for indicating the password of a device to be configured. Max idle time 635 is an integer for defining a maximum idle time for the device to be configured. Auto-reconnect 636 is a boolean that indicates whether the device to be configured should automatically reconnect to the network, and takes a value of 0 or 1.

WAN profile 610 further includes a WAN connection subelement 640 that specifies whether the WAN connection is a DHCP connection or a static IP connection. If the WAN connection is DHCP connection, DHCP element 641 further includes subelement hostname 642. Hostname 642 defines a string signifying the name of the DHCP host. If the WAN connection is a static IP connection, static IP element 643 further includes subelements IP address 644, IP subnet mask 645, IP default gateway 646, all of which must occur in the WAN settings file. IP address 644 defines the static IP address of the device to be configured, and is of type IPv4 address. IP subnet mask 645 defines the IP subnet mask of the device to be configured, and is of type IPv4 address. IP default gateway 646 defines the default gateway for the device to be configured, and is of type IPv4 address.

In addition, WAN settings schema 600 defines IPv4 address type for define instances of IPv4 addresses.

An exemplary implementation of the WAN settings schema 600 is included in Appendix C following this description. An example instance of a WAN settings file generated in conformance with the schema in Appendix C is included in Appendix D following this description.

Figure 7:
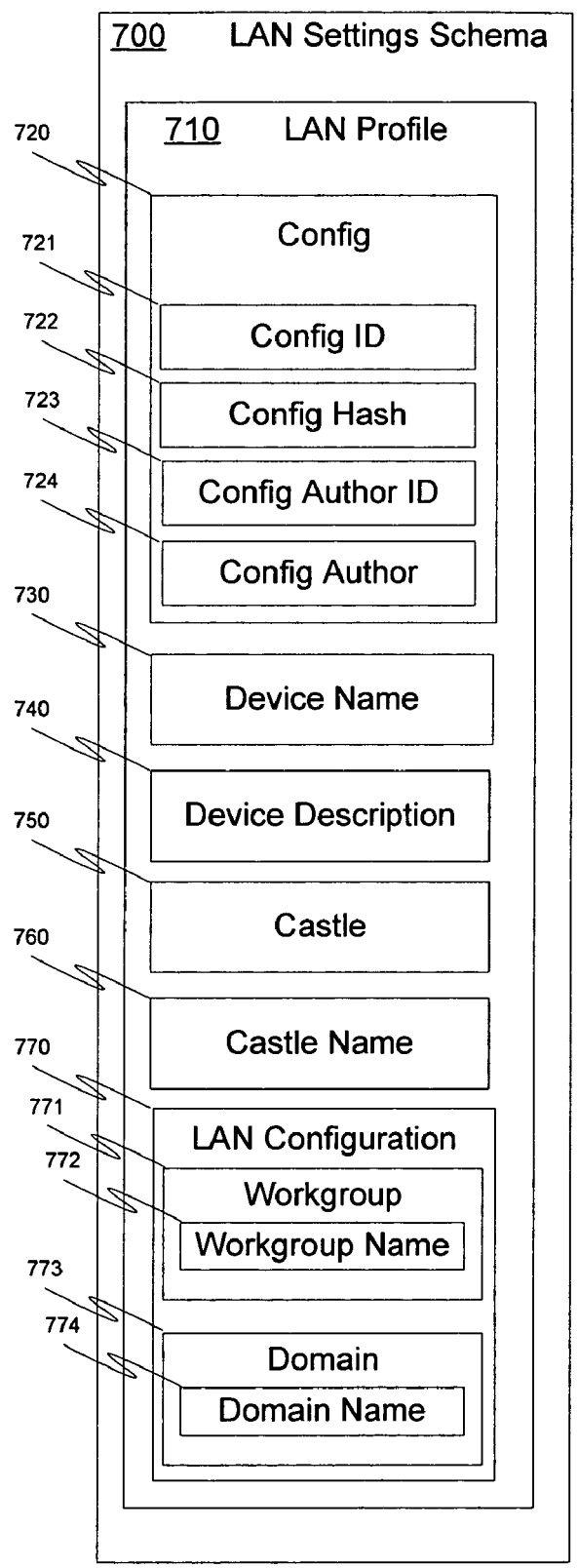
FIG. 7 is a data structure diagram illustrating the local area network settings schema in accordance with an embodiment of the invention.

In accordance with yet another embodiment of the invention, FIG. 7 illustrates a conceptualization of the LAN network settings schema 700. Schema 700 includes a LAN profile element 710, which defines the LAN configuration settings. LAN profile element 710 includes a config subelement 720 for identifying the configuration and the author of the configuration. Config 720 includes subelements config ID 721, config hash 722, config author ID 723, and config author 724. Config ID 721 is a 36 character string for uniquely identifying the configuration, and must occur the LAN settings file once and only once. Config hash 722 is 20 digit hexadecimal number that may be optionally included to test the integrity of the LAN settings file. Config author ID 723 is a 36 character string for uniquely identifying the author of the configuration, and must occur in the LAN settings file once and only once. Config author 724 is a string with a maximum length of 128 indicating the name of the LAN settings file, and must occur in the LAN settings file once and only once.

LAN profile element 710 further includes subelements for defining each of the LAN configuration settings. Subelement device name 730 is a 1-15 character string indicating the name of the device on the network. Device description 740 is a 1-50 character string indicating a description of the device. Castle 750 is a boolean element for indicating whether Castle-type service is enabled. Castle service provides synchronized accounts for secure small-scale networks. Castle Name 760 is a 1-30 character string for indicating the name of the Castle network. The foregoing subelements must occur in the LAN settings file one and only once. Furthermore, LAN profile 710 includes a LAN configuration subelement 770 for indicating whether the LAN is a peer-to-peer-based workgroup network, or a domain-based network. If the configuration is for a workgroup, workgroup element 771 includes a workgroup name subelement 772, which is a 1-15 character string for indicating the name of the workgroup. If the configuration is for a domain-based network, domain element 773 includes subelement domain name 774, which is a 1-15 character string for indicating the domain name for the LAN.

An exemplary implementation of the LAN settings schema 700 is included in Appendix E following this description. An example instance of a LAN settings file generated in conformance with the schema in Appendix E is included in Appendix F following this description.

Figure 8:
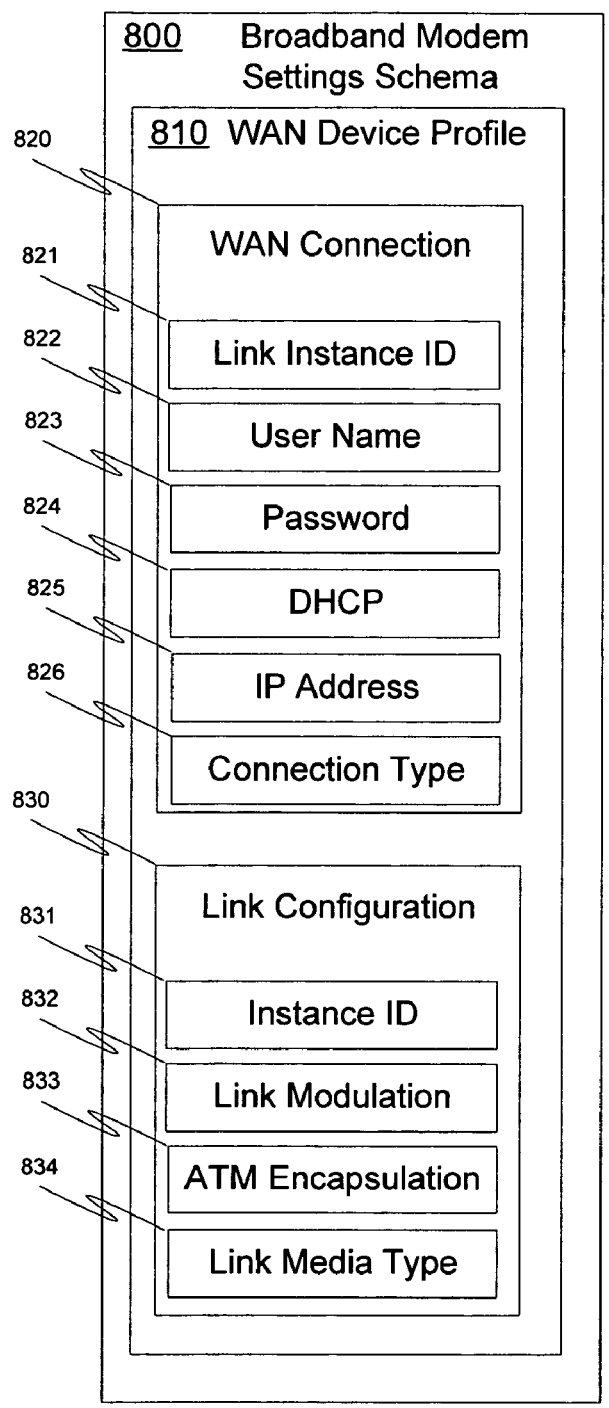
FIG. 8 is a data structure diagram illustrating the broadband modem setting schemas in accordance with an embodiment of the invention.

In accordance with a further embodiment of the invention, FIG. 8 illustrates a conceptualization of the broadband modem settings schema 800. Schema 800 includes a WAN device profile element 810, which defines the broadband modem settings. WAN device profile 810 includes a config subelement 820 for identifying the configuration and the author of the configuration. Config 820 includes subelements config ID 821, config hash 822, config author ID 823, and config author 824. Config ID 821 is a 36 character string for uniquely identifying the configuration, and must occur the broadband settings file once and only once. Config hash 822 is 20 digit hexadecimal number that may be optionally included to test the integrity of the broadband modem settings file. Config author ID 823 is a 36 character string for uniquely identifying the author of the configuration, and must occur in the broadband modem settings file once and only once. Config author 824 is a string with a maximum length of 128 indicating the name of the broadband modem settings file, and must occur in the broadband modem settings file once and only once.

WAN device profile 810 further includes subelements for defining each of the broadband modem configuration settings. Subelement WAN connection 820 defines the configuration for a WAN connection. At least one instance of a WAN connection 820 must occur in the broadband modem settings file, however an unlimited number of WAN connections 820 may occur. WAN connection element 820 includes subelements for defining the WAN device configuration. Subelement link instance ID 821 is a 32 character string for defining a unique ID for the session, and must occur once and only once in the broadband modem settings file. User name 822 and password 823 are 1-64 character strings for indicating a user name and password for accessing the Internet through a broadband ISP. DHCP 824 is a boolean element that indicates whether DHCP is used, and must occur once and only once in the broadband modem settings file. IP address 825 an 8-32 digit hexadecimal number for indicating the IP address assigned to the modem. Connection type 826 is a string for indicating the type of broadband network connection, and may have as a value PPP, PPPoE, PPPoA, IPoA, EoA, Dial PPP, and CIP.

WAN device profile 810 also includes a link configuration subelement 830 for defining the configuration of broadband link. Link configuration 830 must occur in the broadband modem settings file once and only once, and includes subelements for defining the configuration. Subelement instance ID 831 is a 32 character string for uniquely identifying the link session. Link modulation 832 is a string for indicating the modulation type of the link, and may take as a value VDSL, SDSL, ADSLdmt, ADSLlite, IDSL, HDSL, QPSK, 16QAM, 64QAM, 256QAM, Ethernet, Other, or POTS. Link modulation 832 must occur in the broadband modem settings file at least once, but no more than twice. ATM encapsulation 833 is a string for indicating whether ATM encapsulation is LLC or VCMUX. Link media type 834 is a string for indicating whether the link is via DSL, Cable, Ethernet, or POTS.

An exemplary implementation of the broadband modem settings schema 800 is included in Appendix G following this description.

Figure 9:
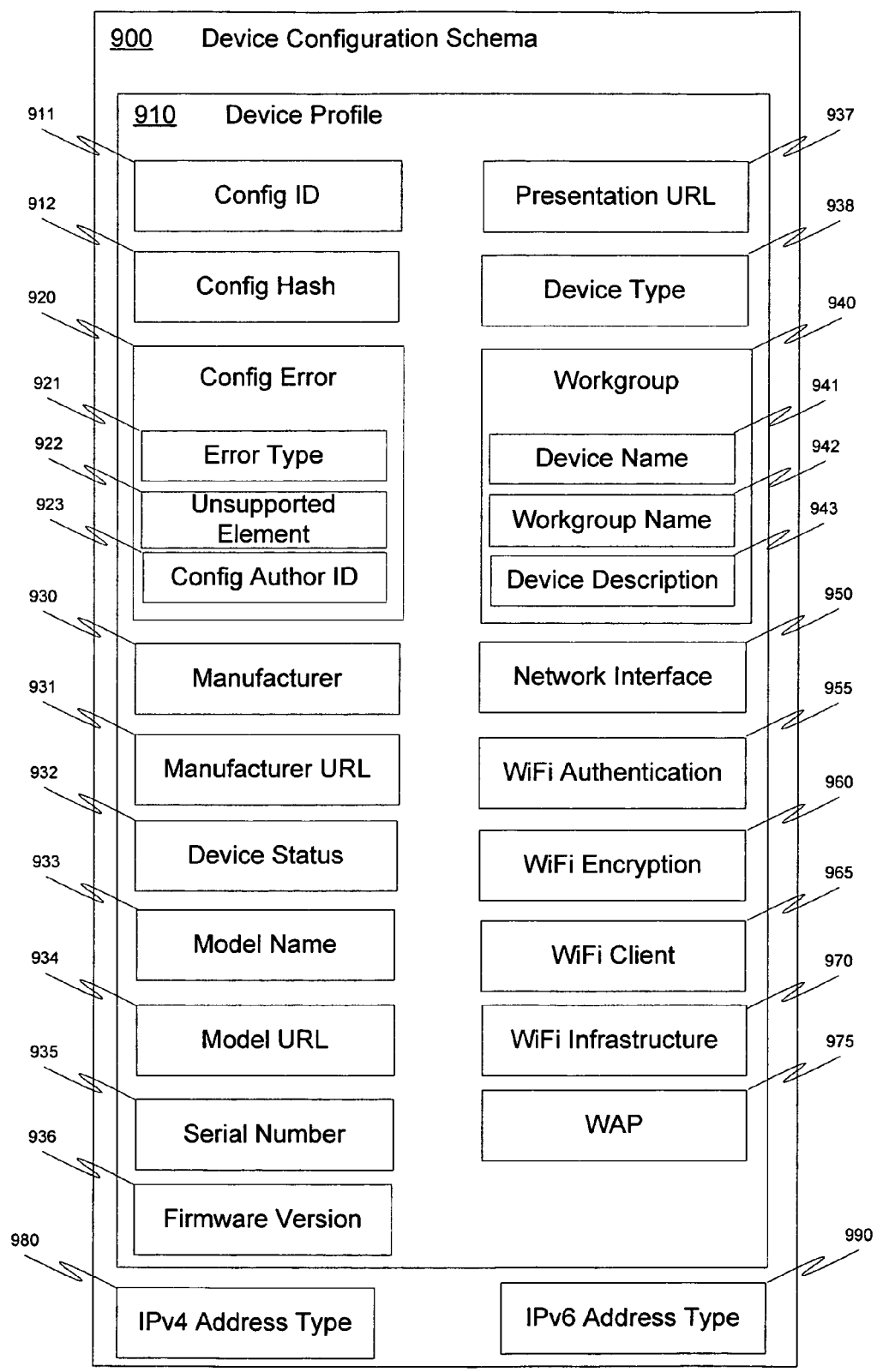
FIG. 9 is a data structure diagram illustrating the device configuration settings schema in accordance with an embodiment of the invention.

In accordance with another embodiment of the invention, FIG. 9 illustrates a conceptualization of the device configuration schema 900. Schema 900 includes a device profile element 910, which defines the device configuration. Device profile 810 includes a subelement config ID 911 that is a 36 character string for uniquely identifying the configuration, and must occur the device configuration file once and only once. Config hash 912 is 20 digit hexadecimal number that may be optionally included to test the integrity of the device configuration file. Device profile 910 further includes an optional config error subelement 920 used for specifying error conditions on the device. An unlimited number of config errors 920 may occur in the device configuration file. Config error 920 includes subelements error type 921, unsupported element name 922, and config author ID 923. Config error type is a string for specifying the type of error that has occurred, and takes as a value one of schema invalid, drive error, unsupported option, invalid hash, and other. Config error type 921 must occur in the device configuration file if config error 920 is included. Unsupported element name is a 1-128 character string for specifying an element of the wireless, WAN, LAN, or broadband modem settings file that is not supported by the device. Config author ID 923 is a 36 character string for uniquely identifying the author of the configuration, and must occur in the device configuration file once and only once if config error 920 is included.

Device profile 910 further includes subelements for identifying the device. Subelement manufacturer 930 is a string indicating the manufacturer of the device, and must occur in the device configuration file once and only once. Manufacturer URL 931 is a URI indicating the web site address of the manufacturer. Device status 932 is a string for indicating the current status of the device. Model name 933 is string for indicating the model name of the device, and must occur in the device configuration file once and only once. Model URL 934 is an optional URI indicating the web site address of a web page specific to the model of the device. This web page may contain instructions for operating the device, or may include patches for updating the device. Serial number 935 is string indicating the serial number of the device, and must occur in the device configuration file once and only once. Firmware version 936 is a string for indicating the version of the firmware installed on the device, and must occur in the device configuration file once and only once. Presentation URL 937 is an optional URI that indicates a web server for the device. Device type 938 is an optional string for indicating the type of device, and may take as a value one of PC, access point, printer, electronic picture frame, digital audio receiver, Windows® media center extender, personal video recorder, printer bridge, projector, pocket PC, and other.

If the device is a member of a workgroup, a workgroup subelement 940 is used to identify workgroup settings. Workgroup 940 includes subelements device name 941, workgroup name 942, and device description 943. Device name is 1-15 character string indicating the name of the device. Workgroup name is 1-15 character string indicating the name of the workgroup. Device description is a 1-50 character string specifying a description of the device.

Device profile 910 further includes a network interface subelement 950 for specifying network settings regarding the IPv4, IPv6, and MAC addresses of the device, the status of the network interface (e.g. active, no signal, authenticating, disabled), the type of media (e.g. 802.3, 1394, 802.11, USB, Bluetooth), the speed of the connection, and whether DHCP is enabled. Network interface 950 is described in greater detail below with regard to FIG. 10.

Device profile 910 further includes a WiFi authentication subelement 955 specifying the wireless authentication protocols (e.g. open, shared, WPA-NONE, WPA, WPAPSK, WPA2, WPA2PSK) used by the device. WiFi authentication 955 is described in greater detail below with regard to FIG. 11. Device profile 910 also includes a WiFi encryption subelement 960 specifying the wireless encryption protocols (e.g. WEP, TKIP, AES) used by the device. WiFi encryption 960 is described in greater detail below with regard to FIG. 12.

Device profile 910 further includes wireless settings profiles specific to the function of the device. If the device is a wireless client, device profile 910 includes a WiFi client subelement 965. This subelement relates to information regarding the regulatory domain of the device, the transmission power of the device, and the network type (e.g. 802.11a/b/g). If the device is a wireless infrastructure device, device profile 910 includes a WiFi infrastructure subelement 970. This subelement relates to information regarding the SSID, network type, channel, and signal strength of the wireless infrastructure. If the device is a WAP, device profile 910 includes a WAP subelement 975. This subelement relates to information regarding the regulatory domain, MAC filter, beacon interval, and network type of the WAP. WiFi client 965, WiFi infrastructure 970, and WAP 975 are described in greater detail below with regard to FIGS. 13, 14, and 15, respectively.

Device profile also defines an IPv4 address type 980 and an IPv6 address type 990 for representing IPv4 addresses and IPv6 addresses, respectively.

Figure 10:
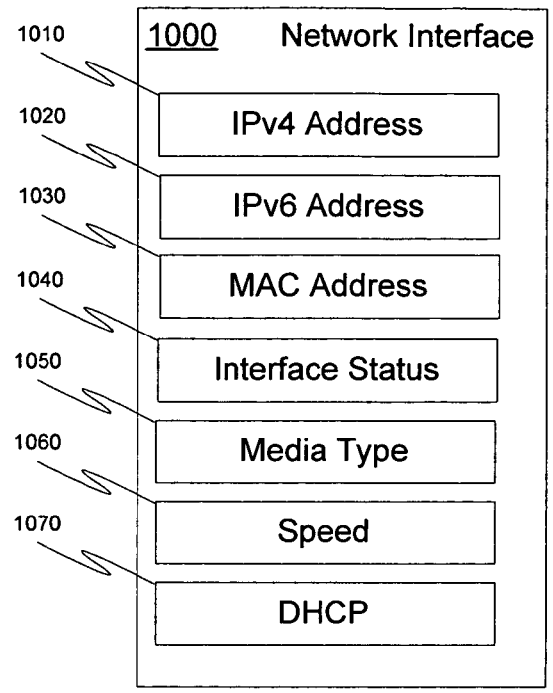
FIG. 10 is a data structure diagram illustrating in greater detail the network interface element shown in FIG. 9.

FIG. 10 illustrates a conceptualization of the network interface subelement 950 shown in FIG. 9. Network interface 1000 includes subelement IPv4 address 1010 for indicating the IPv4 address of the device if one exists. Network interface 1000 may optionally define one more IPv6 addresses 1020 for indicating an IPv6 address of the device. MAC address 1030 is an 8 digit hexadecimal number indicating the MAC address of the device. Interface status 1040 is a string for indicating the status of a network connection, and may take a value of one of active, disabled, no media, authenticating, media, and no signal. Media type 1050 is a string for indicating the type of media, and may take a value of one of 802.3, 1394, 802.11, USB, Bluetooth, and other. Speed 1060 is a positive integer indicating the speed of the device's network connection. DHCO 1070 is a boolean that indicates whether DHCP is enabled for the device. MAC address 1030, interface status 1040, media type 1050, speed 1060, and DHCP 1070 must occur once and only once in the device configuration file.

Figure 11:
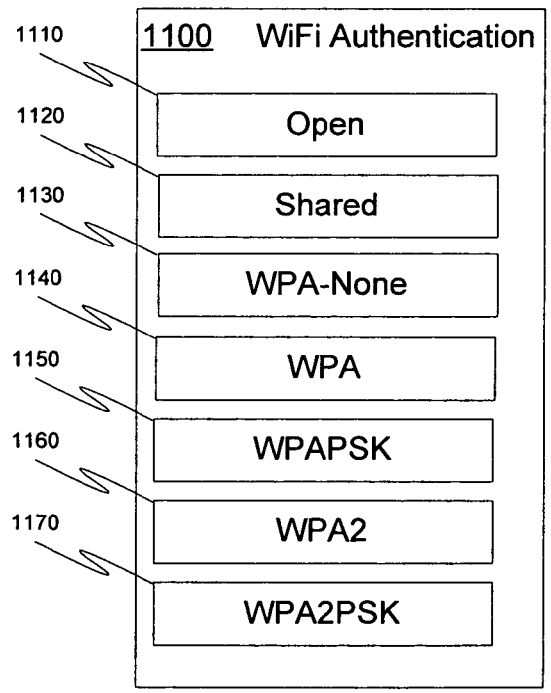
FIG. 11 is a data structure diagram illustrating in greater detail the WiFi authentication element shown in FIG. 9.

FIG. 11 illustrates a conceptualization of the WiFi authentication subelement 955 shown in FIG. 9. WiFi authentication 1100 includes subelements corresponding to authentication types. Each subelement is a boolean that may take a value of 0 or 1, indicating whether the device supports the corresponding authentication. Those subelements include open 1110, shared 1120, WPA-None 1130, WPA 1140, WPAPSK 1150, WPA2 1160, and WPA2PSK 1170.

Figure 12:
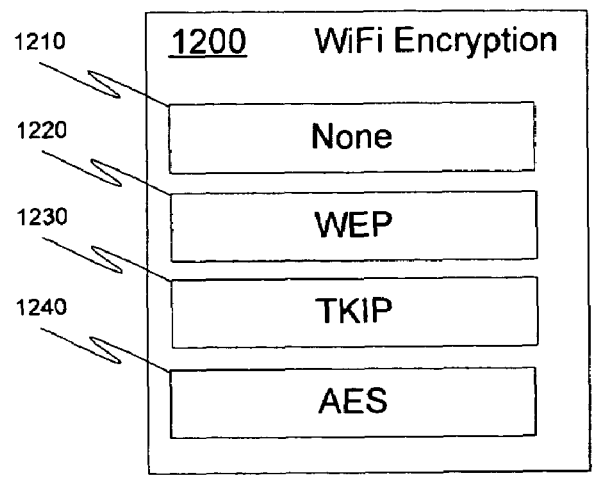
FIG. 12 is a data structure diagram illustrating in greater detail the WiFi encryption element shown in FIG. 9.

FIG. 12 illustrates a conceptualization of the WiFi encryption subelement 960 shown in FIG. 9. WiFi encryption 1200 includes subelements corresponding to encryption types. Each subelement is a boolean that may take a value of 0 or 1, indicating whether the device supports the corresponding encryption type. Those subelements include none (or basic) 1210, WEP 1220, TKIP 1230, and AES 1240.

Figure 13:
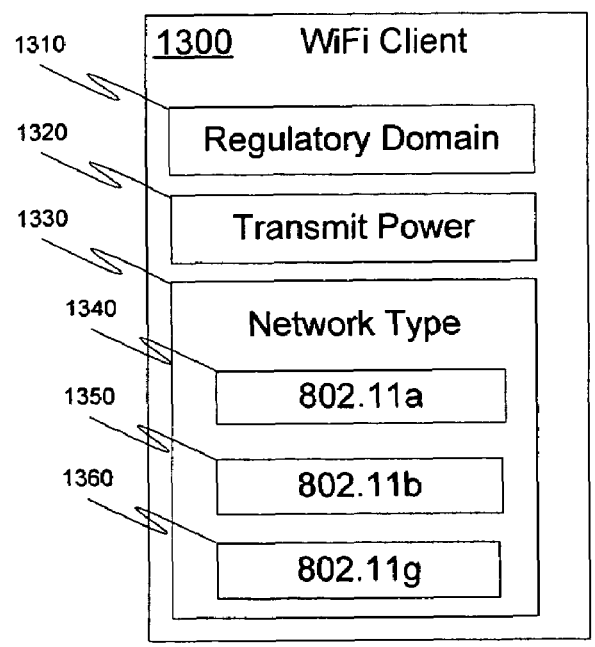
FIG. 13 is a data structure diagram illustrating in greater detail the WiFi client element shown in FIG. 9.

FIG. 13 illustrates a conceptualization of the WiFi client 965 shown in FIG. 9. WiFi client 1300 includes a regulatory domain subelement 1310 that is a 3 character string indicating the country code of the country with which the device is in regulatory compliance. Transmit power 1320 is an integer between −200 and −20 indicating the transmission power of the device in dBm. Network type 1330 is a subelement for indicating the type of network, and includes its own subelements 802.11a 1340, 802.11b 1350, and 802.11g 1360 that are boolean elements for indicating whether the device supports the corresponding IEEE standard.

Figure 14:
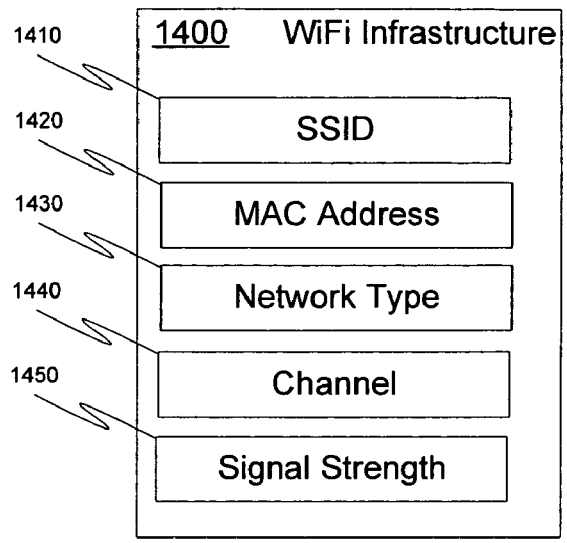
FIG. 14 is a data structure diagram illustrating in greater detail the WiFi infrastructure element shown in FIG. 9.

FIG. 14 illustrates a conceptualization of the WiFi Infrastructure subelement 970 shown in FIG. 9. WiFi infrastructure 1400 includes an SSID subelement 1410 that is a string for indicating the wireless network. MAC address 1420 is an 8 digit hexadecimal number indicating the MAC address of the device. Network type 1430 is a string for indicating the type of network, and may take a value of 802.11a, 802.11b, or 802.11g. Channel 1440 is a positive integer for indicating the channel on which the device is operating. SSID 1410, MAC address 1420, network type 1430, and channel 1440 must occur in the device configuration once and only once, if the device is a wireless infrastructure device. WiFi infrastructure 1400 optionally includes yet another subelement signal strength 1450, which is an integer between −200 and −20 used to indicate the signal strength of the device in dBm.

Figure 15:
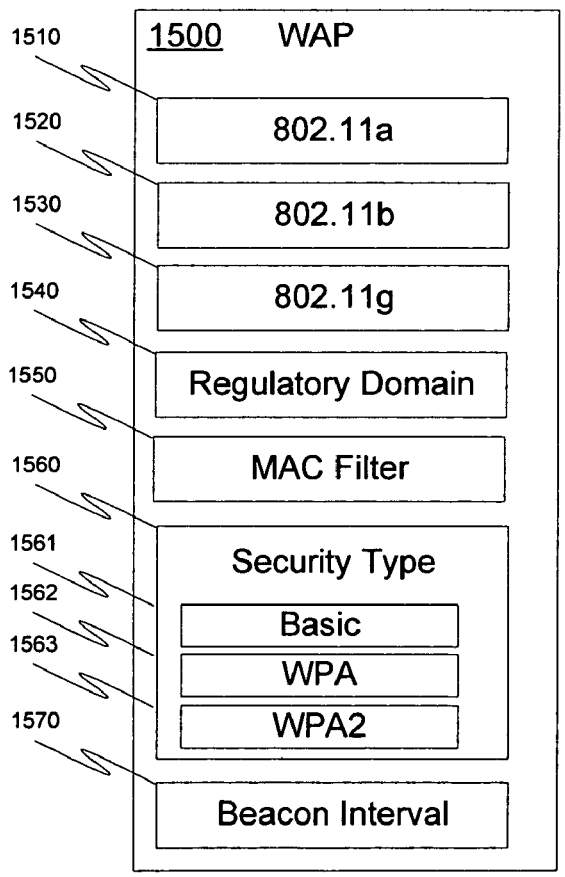
FIG. 15 is a data structure diagram illustrating in greater detail the WAP element shown in FIG. 9.

FIG. 15 illustrates a conceptualization of the WAP subelement 975 shown in FIG. 9. WAP 1500 includes subelements 802.11a 1510, 802.11b 1520, and 802.11g 1530, which are each boolean elements indicating whether the device supports the IEEE 802.11a, 802.11b, and 802.11g standards, respectively. Regulatory domain 1540 is a 3 character string indicating a country code for a country in which the device is in regulatory compliance. MAC filter 1550 is an 8 digit hexadecimal number indicating the MAC address of a device allowed to associate with the present device. The device configuration file may include an unlimited number of instances of the MAC filter element 1550. Security type 1560 is a subelement that indicates type if security used in the wireless beacon. Security type 1560 includes subelements basic 1561, WPA 1562, and WPA2 1563, which are each boolean elements indicating whether the device uses basic, WPA, or WPA2 security protocol, respectively. Beacon interval 1570 is an integer between 1 and 3600, indicating the millisecond interval at which the device issues a beacon signal.

An exemplary implementation of the device settings schema 900 is included in Appendix H following this description. An example instance of a device settings file generated in conformance with the schema in Appendix H is included in Appendix I following this description.

It will be appreciated that an improved system and method for network device configuration have been disclosed herein. In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method of configuring a network device using a portable, physical computer storage medium having stored thereon an Extensible Markup Language (XML) file instance conforming to an XML schema for wireless device configuration comprising:
    reading in the XML schema from the portable, physical computer storage medium, wherein the XML schema includes:
        a network identifier element identifying the name of the network that the network device will connect to; and
        a network encryption key element used for encryption on the wireless network;
    reading in a configuration setting;
    generating a configuration settings XML file instance in accordance with the XML schema; and
    configuring the network device using the configuration settings XML file instance.

2. The method of claim 1, wherein the XML schema further comprises:
    a connection type element wherein the connection type element comprises a string for indicating a network connection type;
    an authentication type element wherein the authentication element further comprises a string indicating the authentication protocol used by the wireless network;
    an encryption type element wherein the encryption element further comprises a string indicating the encryption protocol used by the wireless network; and
    a device mode indicator element wherein the device mode indicator element comprises is a string that indicates the mode in which the wireless access point is operating.

3. The method of claim 1, wherein the XML schema further comprises:
    a automatic key element for indicating whether a network key is provided automatically;
    an 802.1x element for indicating whether a device supports IEEE 802.1x protocol; and
    a frequency indicator element wherein the frequency indication represents the channel and frequency used by the network.

4. The method of claim 1, wherein the XML schema further comprises a time-to-live element for defining a time for which an instance of the schema is valid.

5. A method for configuring a network device using a physical, portable computer storage medium comprising an XML file instance conforming to an XML schema for broadband modem device configuration, the method comprising:
    reading in the XML schema from the portable, physical computer storage medium, wherein the XML schema includes:
        a session instance identifier element defining a unique ID for the session;
        a DHCP element for indicating whether DHCP is supported; and
        a link modulation element for indicating a type of broadband connection
    reading in a configuration setting;
    generating a configuration settings XML file instance in accordance with the XML schema; and
    configuring the network device using the configuration settings XML file instance.

6. The method of claim 5, wherein the XML schema further comprises:
    a user name element that indicates a user name for accessing the Internet through a broadband ISP; and
    a password element that indicates a password for accessing the Internet through a broadband ISP.

7. The method of claim 5, wherein the XML schema further comprises an asynchronous transfer mode (ATM) encapsulation element for indicating a type of ATM encapsulation wherein the encapsulation element indicates whether ATM encapsulation is LLC or VCMUX.

8. The method of claim 3, further comprising a configuration schema wherein the configuration schema further comprises:
    a configuration ID comprising a string for uniquely identifying the configuration;
    a configuration hash comprising a number used test the integrity of the wireless setting file;
    a configuration author ID comprises a string for identifying an author of the configuration; and
    a configuration author comprises a string indicating the a name of a wireless settings file.

9. The method of claim 3, further comprising an SSID wherein the SSID represents a name of the wireless network.

10. The method of claim 3, further comprising a primary profile and an operation profile.

11. The method of claim 3, further comprising a profile instance wherein the profile instance further comprises:

a network key element wherein the network key is used for encryption on the wireless network;

a key index element wherein the key index element further comprises an integer for indicating the location of the specific key used to encrypt messages;

an EAP method element wherein the element further comprises a string for indicating the Extensible Authentication Protocol used; and a TTL element wherein the TTL element further comprises an integer for indicating a time-to-live that specifies the length of time a network key is valid.

12. The method of claim 3, wherein the authentication element further comprises one selected from a group comprising open, shared, WiFi Protected Access (WPA), WPA Pre-Shared Key (PSK), WPA-none, WPA2, or WPA2 PSK.

13. The method of claim 11, wherein the encryption element further comprises one selected from a group comprising none, Wireless Encryption Protocol (WEP), Temporal Key Integrity Protocol (TKIP), and Advanced Encryption Standard (AES).

14. The method of claim 11, wherein the LAP method element comprises one selected from a group comprising a value of EAP-TLS, PEAP-EAP-MSCHAPv2, or PEAP-EAP-TLS.

15. The method of claim 2, wherein the device mode indicator has a value selected from a group comprising infrastructure, bridge, repeater, or station.

16. The method of claim 5, wherein the XML schema further comprises a WAN connection element and a link configuration element.

17. The method of claim 16, wherein the WAN connection element further comprises:

a link instance ID wherein the link instance ID comprises string for defining a unique ID for the session, an IP address wherein the IP address comprises a number for indicating the IP address assigned to the modem, and a connection type wherein the connection type indicates a network connection type.

18. The method of claim 5, wherein the link configuration element further comprises a link media type wherein the link media type defines the configuration of broadband link.

* * * * *